March 20, 1928.

E. R. STODDARD ET AL

1,663,320

GLASS GRINDING MACHINE

Filed June 11, 1925

INVENTOR
EDGAR R. STODDARD
LOUIS C. ZILKY
BY
ATTORNEY

March 20, 1928.  
E. R. STODDARD ET AL  
1,663,320  
GLASS GRINDING MACHINE  
Filed June 11, 1925  
8 Sheets-Sheet 6

INVENTOR  
EDGAR R. STODDARD  
LOUIS C. ZILKY  
BY  
*P. M. Pomeroy*  
ATTORNEY March 20, 1928.  
E. R. STODDARD ET AL  
1,663,320

GLASS GRINDING MACHINE

Filed June 11, 1925   8 Sheets-Sheet 7

INVENTOR  
EDGAR R. STODDARD  
LOUIS C. ZILKY.  
BY  
*P. M. Pomeroy*  
ATTORNEY Patented Mar. 20, 1928.

1,663,320

UNITED STATES PATENT OFFICE.

EDGAR R. STODDARD AND LOUIS C. ZILKY, OF SOUTH BEND, INDIANA, ASSIGNORS TO THE STUDEBAKER CORPORATION, OF SOUTH BEND, INDIANA, A CORPORATION OF NEW JERSEY.

GLASS-GRINDING MACHINE.

Application filed June 11, 1925. Serial No. 36,382.

This invention relates to machines for grinding glass, and more particularly to machines for grinding or rounding the edges of sheet or plate glass.

Heretofore in the grinding or rounding of the edges of glass plates or sheets, it has been the practice to use a relatively large grinding wheel mounted on a vertical shaft, the upper surface of the wheel lying in a horizontal plane and sometimes parallel and adjacent to a table. The sides of the sheet of glass whose edges are to be rounded are grasped by the workman and the sheet is placed on the revolving wheel, the workman moving it over the surface of the wheel and at the same time rocking it back and forth on each side of its vertical position until the lower edge attains the desired form. The glass is then turned to bring another edge into contact with the wheel and the operation is repeated, and this goes on until all the edges have been ground. Not only is this process slow and laborious, but it requires considerable skill and training on the part of the workman to produce a round and even edge, and during the operation the abrasive material, which is usually used in conjunction with such grinding wheels, often adheres to the glass despite a subsequent rinsing operation, and causes scratches to appear on the surface of the sheet in the subsequent handling of the same.

With the above in view, it is the principal object of the present invention to provide a machine for grinding and rounding the edges of glass sheets, whereby the same may be easily, quickly and readily accomplished without the use of skilled labor and with but slight danger from subsequent scratching of the glass through adhesion of particles of abrasive thereto in the subsequent handling operations.

Another object is to provide a machine for grinding the edges of glass sheets, which machine comprises a grinding wheel mounted on a horizontal shaft, a table, and means for supporting a sheet of glass in vertical position and moving it across the table and wheel.

Another object is to provide a machine for grinding the edges of sheet glass, in which a grinding wheel is mounted on a horizontal shaft beneath a horizontally movable carriage, the grinding wheel projecting slightly above the upper surface of a horizontal table positioned on either side of said wheel, and the carriage being adjustable to receive different heights and widths of glass in a vertical position.

Another object is to provide a machine for grinding the edges of glass sheets, comprising a grinding wheel rotatable about a horizontal shaft, a carriage adapted to support a sheet of glass in vertically disposed position and to move the same across the grinding wheel, and a horizontally disposed table on which the sheet of glass is adapted to rest and which is adjustable vertically to adjustably position the glass in respect to the grinding wheel.

Another object is to provide a machine of the class described provided with a carriage for passing a sheet of glass over a grinding wheel, which carriage is reversible in direction of travel so that one edge of a sheet of glass may be ground while the carriage is moving in one direction across the grinding wheel, and which, after the glass has been passed over the wheel and has been turned to bring another edge into grinding position, or has been replaced by another sheet of glass, may be reversed so as to grind such other edge during the reverse movement of the carriage.

A further object is to provide a machine of the class described comprising a base journaling a horizontal shaft to which a grinding wheel is secured, the base being provided with a longitudinally extending way on which a carriage is slidably mounted and adapted to be moved back and forth thereon, the carriage being provided with upright ways receiving horizontal ways adjustable vertically to accommodate different heights of glass sheets, and the horizontal ways in turn receiving vertically disposed ways adjustable to and from each other to accommodate different widths of glass sheets, the last named ways carrying means for holding sheets of glass in vertical position and moving them across the grinding wheel, a vertically adjustable table being supported on the base adjacent the grinding wheel for positioning the lower edge of the glass sheet in proper relationship with the grinding wheel for the grinding operation.

The above being among the objects of the present invention, the same consists of certain novel features of construction and combinations of parts to be hereinafter described with reference to the accompanying drawings and then claimed, having the above and other objects in view.

In the accompanying drawings which illustrate a suitable embodiment of the present invention, and in which like numerals refer to like parts throughout the several different views;

Figure 4 is a plan view of the machine, a portion of the table being broken away to show the grinding wheel.

Figure 5 is a transverse sectional view taken on the line 5—5 of Figure 13 showing the mechanism for raising and lowering the table.

Figure 6 is a partially broken enlarged view of the back of the machine.

As set out in the above objects, the machine shown in the accompanying drawings comprises essentially a stationary base, a rotatable grinding wheel supported on the base about a horizontal axis, a table at the upper surface of the grinding wheel for positioning the glass to be ground in proper relation to the grinding wheel, and a movable carriage for holding the sheet of glass to be ground in a vertical position and for passing it across the grinding wheel, together with certain other features which will be set out in the following description.

Figure 1:
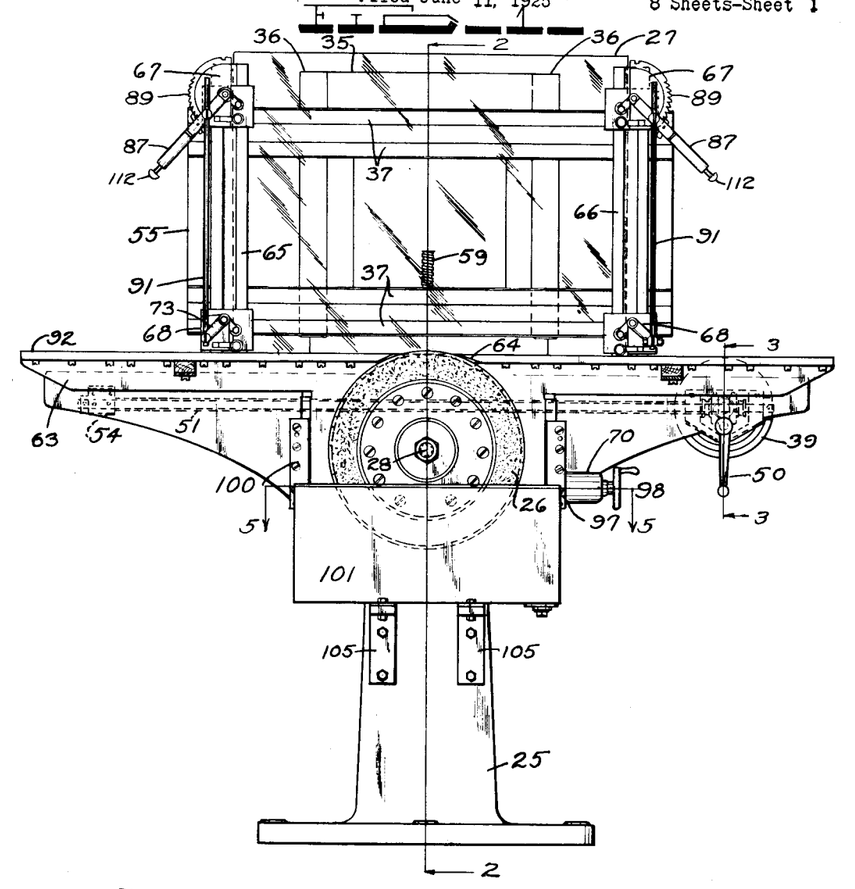
Figure 1 is a front elevation of the glass grinding machine embodying the present invention, with the front extension of the table removed to better illustrate the grinding wheel and associated mechanism.
Figure 13:
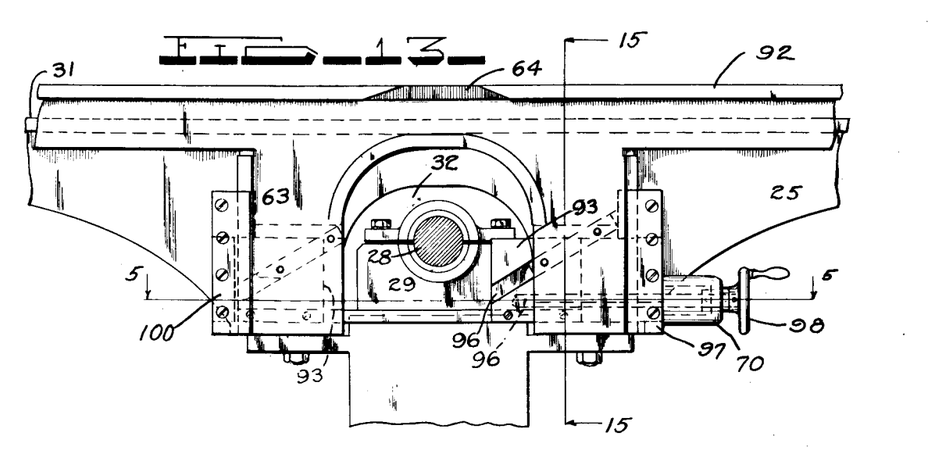
Figure 13 is a fragmentary view of the front of the machine with the grinding wheel and water pan removed and without the carriage.
Figures 17, 18, 19, 20, 21:
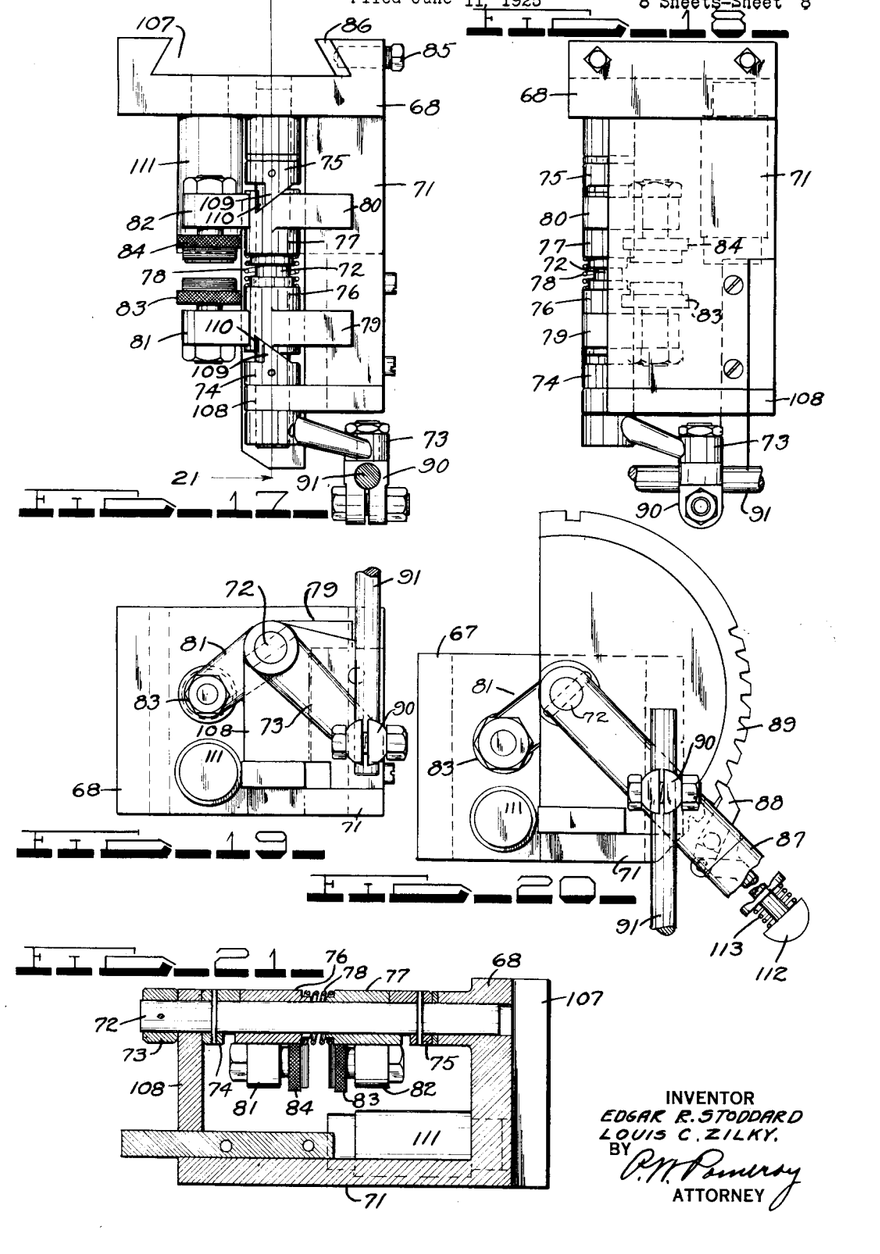
Figure 17 is an enlarged plan view of one of the lower glass holding devices.
Figure 18 is a side elevation of the glass holding device shown in Figure 17.
Figure 19 is an end elevation of the glass holding device shown in Figures 17 and 18.
Figure 20 is an end view of one of the upper glass holding devices, showing the operating lever and ratchet sector.
Figure 21 is a sectional view taken on the line 21—21 of Figure 17.
Figure 22:
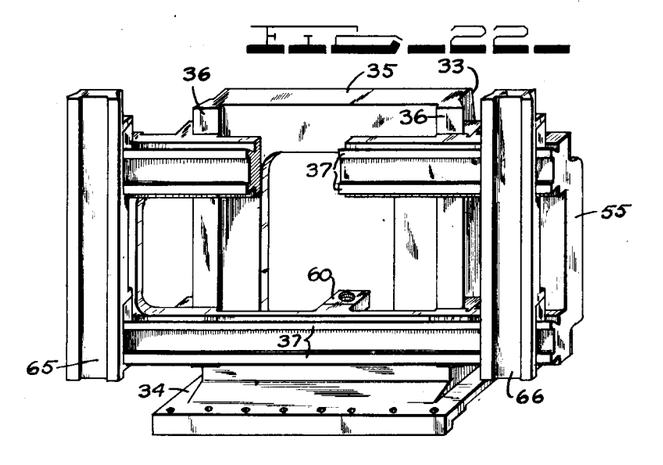
Figure 22 (Sheet 5) is a perspective view of the table and co-operating ways, without the glass holding means positioned thereon.

The base 25, composed of an upper and lower section, is of the heavy, rigid type, the upper portion thereof extending outwardly to form two horizontal longitudinally extending parallel ways 31 on its upper surface. Below the ways 31 is an opening 32 (see Figures 2 and 13) in which is positioned a journal box 29 for journaling the horizontal shaft 28 which receives, on its forward end, the grinding wheel 26, the latter being positioned in a vertical plane in front of the front face of the base 25. A suitable pulley 30 secured to the opposite or rear end of the shaft 28 serves as a means for causing rotation of the shaft 28 and grinding wheel 26. Slidably supported on the ways 31 is a carriage 34 (see Figure 22) provided with two upwardly extending arms 33 connected across the top by an integral bar 35 thus forming a frame. The carriage 34, by means of the hereinafter described devices, is adapted to support a sheet of glass such as 27 in a vertical position, and in the plane of the grinding wheel 26, and carry it across the latter. The forward faces of the arms 33 are formed to provide vertically disposed ways 36 on which a vertically slidable frame 55 (see Figures 6 and 22 particularly) is secured. The frame 55 is in turn provided with two horizontally extending ways 37 which slidably receive the two vertical way members 65 and 66 which are independently horizontally adjustable along the same. To each of the vertical way members 65 and 66 is secured an upper glass guiding or clamping member 67 (see Figures 1 and 2) and a lower glass guiding or clamping member 68, each member 67 or 68 being vertically adjustable along the vertical way members 65 and 66 independently of each other. The vertical clamping or guiding members are made adjustable to accommodate different heights of glass within the ordinary limits of the machine, the vertically adjustable frame 55 being provided for taking care of any unusual heights of glass that might occur. The vertically extending horizontally slidable way members 65 and 66 upon which the guiding or clamping members are adjustable, are made horizontally adjustable on the frame 55 to accommodate different widths of glass. The guiding or clamping members 67 and 68 which will be described in detail later, are locked in adjusted position on the vertical way members 65 and 66 by means of screws such as 85 pressing against the gibs 86, as shown in Figure 17 and the remaining sliding way and frames are locked to their respective ways in a similar conventional manner.

Figure 7:
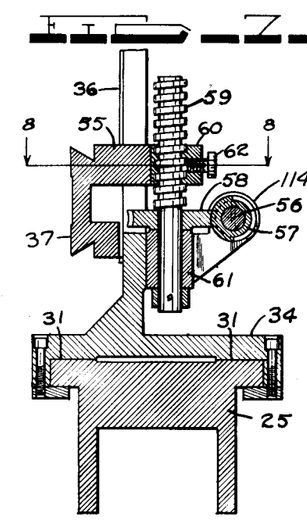
Figure 7 is a transverse sectional view of the carriage and lower cross-way, showing the means for vertically adjusting the latter, taken on the line 7—7 of Figure 6.
Figure 8:
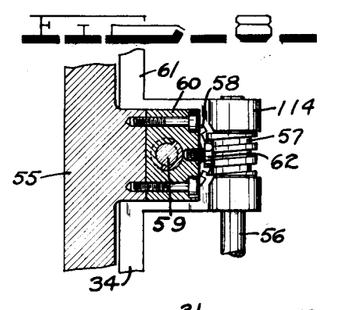
Figure 8 is a horizontal sectional view taken on the line 8—8 of Figure 7.
Figure 9:
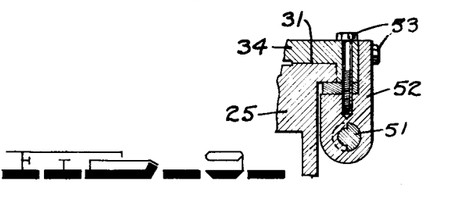
Figure 9 is a vertical section through the carriage driving screw and driving lug taken on the line 9—9 of Figure 6.

In order to more readily adjust the frame 55 vertically on the ways 36, (see Figures 7 and 8) a bracket 61 is secured to the carriage 34 for rotatably but axially immovably supporting the vertically extending screw 59 which extends upwardly therefrom and threads into the block 60 secured to the frame 55. A worm wheel 58 is rigidly secured to the screw 59 and meshes with a worm 57 formed on a horizontally extending shaft 56 supported on an extending arm 114 of the bracket 61, the shaft 56 extending longitudinally of the machine and passing through one of the arms 33 in which it has a bearing, and its projecting end is squared so as to readily receive a wrench or lever for the purpose of rotating it. It will be apparent that when the shaft 56 is rotated, rotating the worm 57, the worm wheel 58 and screw 59 will be rotated, causing the frame 55 to be either raised or lowered according to the direction of rotation of the shaft 56. A screw 62, threading through the block 60, is adapted to be threaded against the screw 59 after the frame 55 has been adjusted to proper position, to lock the screw 59 and consequently the frame 55 against inadvertent movement.

Figure 10:
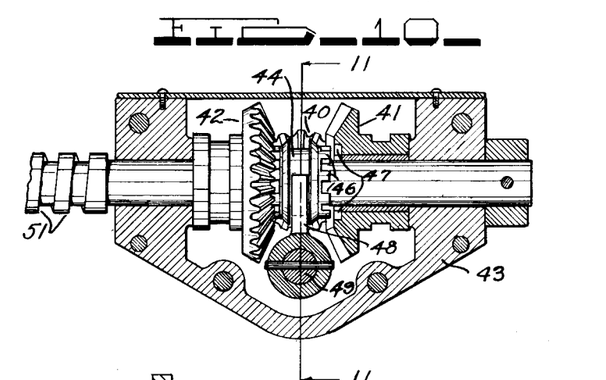
Figure 10 is a section taken on the line 10—10 of Figure 3, showing the means for reversing the carriage drive.
Figure 11:
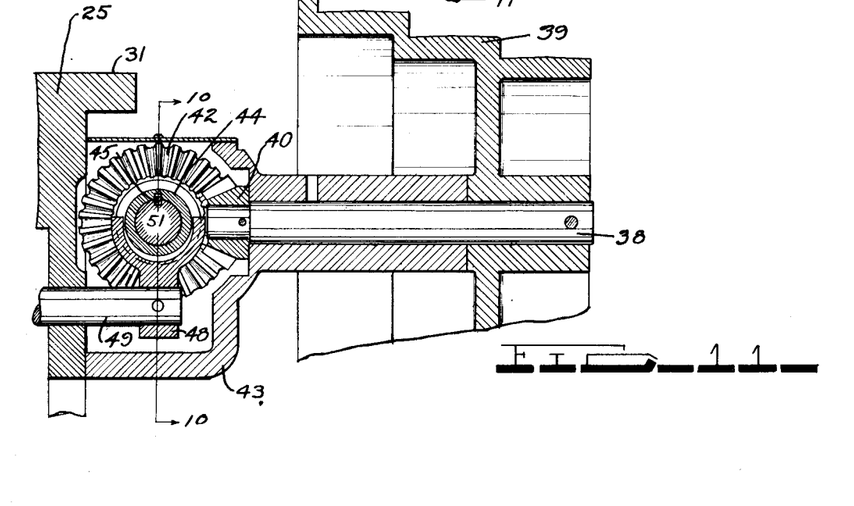
Figure 11 is a section taken on the line 11—11 of Figure 10.
Figure 12:
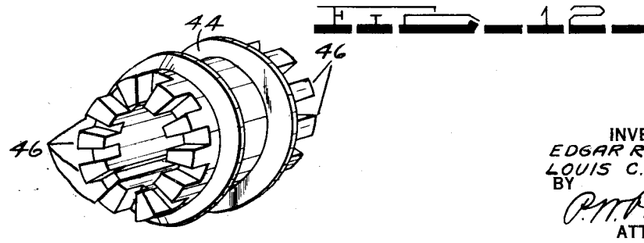
Figure 12 is a perspective view of the clutch dog member used in the construction shown in Figures 10 and 11.

The carriage 34 is caused to slide back and forth on the ways 31, to carry the sheet of glass 27 across the wheel 26, by means of a rotatable, non-axially movable screw 51, threading in the block 52 secured by the screws 53 to and depending from the rear edge of the carriage 34. The screw 51 extends across the back of the machine and is journaled at its right hand end, as viewed in Figure 6, by a journal box 54 secured to the base 25, and at the left hand end by the housing 43 through which it projects. Rotatably supported on the screw 51 within the housing 43 are two spaced opposed bevel gears 41 and 42, (see Figures 10, 11 and 12) both of which are in meshing relation with a third bevel gear 40 non-rotatably secured to a shaft 38, journaled in the housing 43, and extending rearwardly therefrom, its rearwardly projecting end having the step cone pulley 39 mounted thereon for causing rotation thereof. Axially slidable but non-rotatably received on the screw 51 between the gears 41 and 42 is a dog clutch collar member 44 provided with conventional lugs such as 46 on either end thereof which are adapted to interlockingly engage similar lugs 47 on the adjacent face of the bevel gears 41 and 42 when brought into engagement therewith. The collar 44 may be moved axially to engage either gear 41 or 42 by means of a yoke 48 secured to the rockable shaft 49 journaled in and extending forwardly out through the base 25, and which receives on its projecting end the handle or lever 50 (see Figure 1) which is provided for manually rocking the shaft 49.

A torsional coil spring 116 is provided surrounding the shaft 49 and has one end anchored in the shaft 49 and the other end anchored in the base 25 so that it exerts a constant tendency to hold the collar 44 midway between and out of engagement with the gears 41 and 42.

It will be apparent that if the pulley 39 is being rotated, and the collar 44 is positioned between the gears 41 and 42 and not in engagement with either, the gears 41 and 42 will be caused to rotate, each in a separate direction, without causing rotation of the screw 51 because both gears are freely rotatable on the screw 51. If, however, the collar 44 is moved over so that the lugs 46 on its right hand end, as viewed in Figure 10, engage the complementary lugs 47 on the gear 41, the gear 41 in turning will cause the collar 44 to turn, and the collar 44, through the medium of the key 45, (see Figure 11) will cause the screw 51 to rotate in a direction corresponding to the direction of rotation of the gear 41, and will accordingly cause the carriage 34 to move either in one direction or the other on the ways 33 according to the direction of rotation of the gear 41. When it is desired to reverse the direction of travel of the carriage 34, the handle 50 is moved to slide the collar 44 out of engagement with the gear 41 and into engagement with the gear 42, which, because it is turning at all times in the opposite direction of rotation to the gear 41, will cause the screw 51 to be rotated in the opposite direction and thereby reverse the direction of travel of the carriage 34. By this means the carriage 34 is caused to move the glass 27 across the grinding wheel 26 in either direction.

Figure 14:
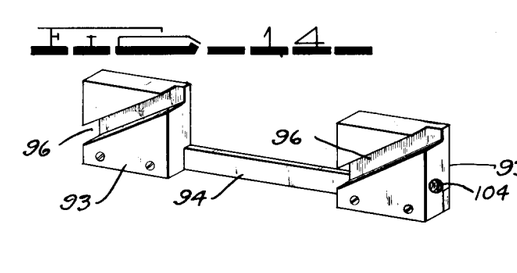
Figure 14 is a perspective view of the cam blocks used to raise and lower the table.
Figure 15:
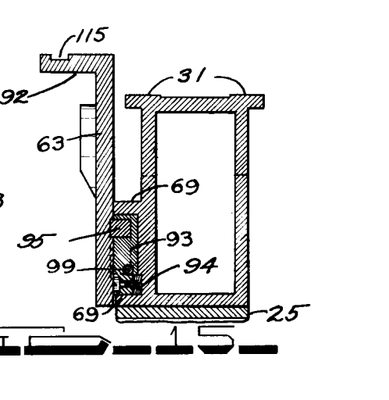
Figure 15 is a section taken on the line 15—15 of Figure 13.
Figure 16:
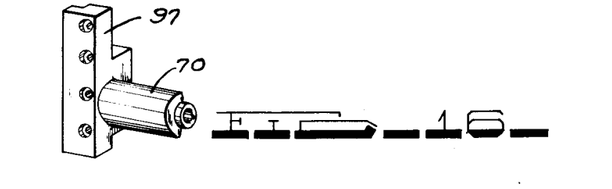
Figure 16 is a perspective view of the nut member which is secured to the base and which rotatably receives the screw employed for moving the cam blocks shown in Figure 14.

Vertically adjustable on the front face of the base 25 is a bracket member 63 (see Figures 1 and 13) provided with an angular upper flange 92 forming a table, hereafter referred to by the numeral 92 for convenience, on which the sheet of glass 27 is adapted to rest, and to slide thereon across the grinding wheel 26. The table 92 is provided immediately adjacent the upper portion of the grinding wheel 26 with a notch 64 through which the grinding wheel 26 is adapted to project a slight amount above the upper surface of the table 92 in order to engage the sheet of glass 27, the table and bracket being adjustable vertically on the face of the base 25 to regulate the amount which the wheel 26 projects above the table 92, and to compensate for any wear of the wheel 26. The means for so adjusting the table 92 and bracket 63 is as follows. The face of the base 25 is provided with two horizontal parallel ribs or ways (see Figure 15) 69 between the adjacent faces of which two block members 93, (see Figure 14) connected together in spaced relation by a bar 94, are slidably received. Each block member 93 is provided with a groove 96 on its outer face, which groove extends angularly across the same. The bracket 63 is held against the outer ends of the ways 69 by means of guide members 97 and 100 (see Figures 1, 5 and 13) which overlie the vertical edges of the bracket 63 and are bolted to the base 25, and they engage the end surfaces of the bracket 63 so as to prevent any movement thereof except in a vertical plane. As best shown in Figure 15, key members 95, of a size to be slidably received in the grooves 96, are secured to the rear face of the bracket 63 in such position and at such an angle that they will be received in the grooves 96 when the bracket 63 is secured in vertically slidable position against the face of the two ribs 69 by the guide members 97 and 100. The guide member 97 (see Figures 5, 13 and 16) is provided with a projecting portion 70 which is adapted to rotatably but non-axially movably receive therein the screw 99 which extends therethrough and which is threaded into the opening 104 (see Figure 14) in the end of the adjacent block 93, the other end of the screw 99 non-rotatably receiving the hand wheel 98 which is provided for the purpose of turning the same. When the wheel 98 is turned to rotate the screw 99 the blocks 93 are moved either one way or the other according to the direction in which the screw is rotated, and it will be obvious that when the blocks 93 are thus moved, the bracket 63 and table 92 will be caused to move up or down because of the keys 95 sliding in the grooves 96 and confined against endwise movement. This means affords ready adjustment of the top of the table 92 in respect to the upper surface of the grinding wheel 26. As a matter of convenience in loading and unloading the machine, a wooden extension 102 is provided on the front face of the table 92.

Supported on the face of the base 25 by brackets 105 is a tank 101 which extends up and around the lower portion of the grinding wheel 26 and is adapted to carry water, or other compound generally used in connection with grinding operations, in which the lower surface of the wheel is immersed. Depending skirt members 103 are provided on the table extension member 102 and are slidably received in the tank 101 to prevent the spray or mist caused by the grinding wheel 26 passing through the water in the tank from escaping therefrom.

Figure 23:
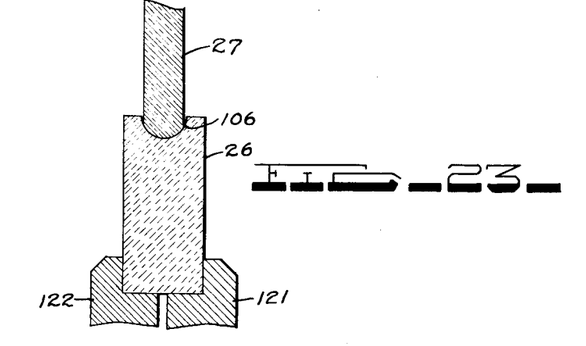
Figure 23 (Sheet 1) is fragmentary sectional view of the grinding wheel in grinding position relative to a sheet of glass, as on the line 2—2 of Figure 1.

It may be desired to grind the edges of the glass 27 flat, in a plane perpendicular to the surface thereof, or it may be desired to grind them on an angle, or to bevel them, or as shown in Figure 23 (Sheet 1) to round them. In any case it is quite obvious that the surface of the grinding wheel may be dressed to conform to the shape of edge desired. As shown in Figure 23, in order to obtain a round edge on the sheet of glass 27, a groove such as 106 is formed in the surface of the grinding wheel 26, and the glass 27 is guided through this groove.

Figures 2, 3:
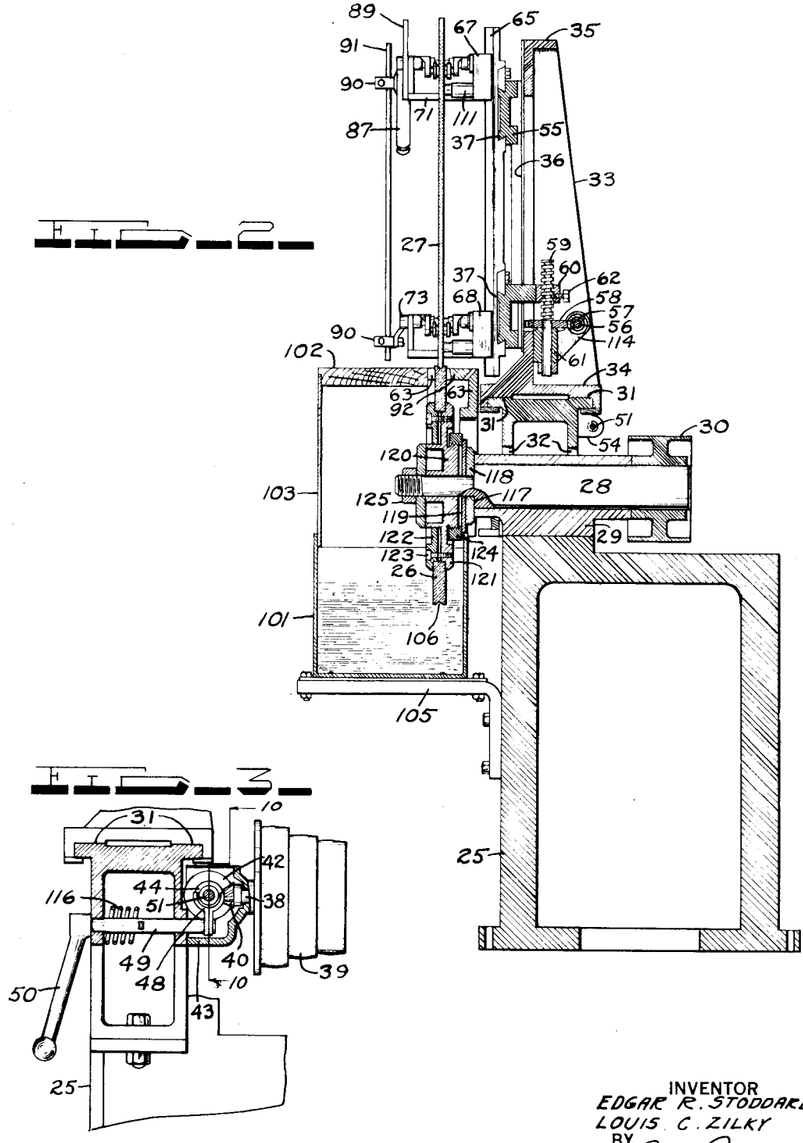
Figure 2 is a transverse section of the machine taken on the line 2—2 of Figure 1.
Figure 3 is a transverse section through the carriage driving means and reversing mechanism taken on the line 3—3 of Figure 1.

When relatively large sheets of glass 27 are operated upon, it is usually sufficient to merely loosely guide the glass in a vertical position and pass it across the wheel 26, its weight causing it to bear against the wheel 26 with sufficient force to accomplish the desired grinding effect, and in such a case it is preferable to form a groove such as 115, as shown in Figures 4 and 15, along the length of the table 92 in line with the groove 106 in the surface of the grinding wheel 26, such groove 115 guiding the lower edge of the glass 27 in proper relationship with the groove 106 in the wheel 26. When small sheets of glass 27 are operated upon, in which case their weight is not sufficient to hold them against the wheel 26 with the proper force, it is preferable to provide some means for holding them positively against the wheel 26, and it is for that purpose that the types of guiding and clamping members 67 and 68, as shown, are provided. As the construction of the members 67 and 68 are essentially the same with the exceptions of certain details which will be mentioned later, the lower members 68 will be described in detail and then the modifications thereof as applied to the upper members 67 will be explained. Each lower member comprises a base, which for the sake of convenience is designated by the numeral 68, in Figures 17, 18, 19, and 21, provided with a dove tail recess 107 which receives one of the ways on the vertical horizontally adjustable ways 65 and 66 previously referred to, and is vertically slidable thereon, being locked in vertically adjusted position by means of the gib 86 and screw 85. Projecting forwardly therefrom in a horizontal direction is a supporting part 71 provided at its free end with a flanged portion 108. Journaled between the base 68 and flanged portion 108 is a horizontal shaft 72 the axis of which is perpendicular to the face of the machine. On the shaft 72 between the flanged portion 108 and the base 68 are secured two ratchet members 74 and 75, the member 74 being positioned adjacent the flange portion 108 and the member 75 being positioned adjacent the base 68. Each member is provided with a radial ratchet tooth 109 facing towards the opposite member. Rotatably received on the shaft 72 between the members 74 and 75 and pressed out thereagainst by the spring 78 are two notched members 76 and 77. Each notched member 76 and 77 is provided with a radial notch 110 which co-operatively engages the radial ratchet teeth 109 on the co-operating ratchet members 74 and 75. Each notch member 76 is provided with an extending arm portion 79 which bears against the supporting part 71 and prevents relative rotary movement thereof in respect to the part 71, and the notch member 77 is likewise provided with a similar arm 80. Projecting from the notch members 76 and 77 on the side opposite the arms 79 and 80 are two other arms 81 and 82, in the ends of which are supported in parallel relation to the axis of the shaft 72, and in opposed relation, two resiliently faced clamping buttons 83 and 84. A lever 73 non-rotatably secured to the outer end of the shaft 72 is provided for rotating the shaft 72. It will be apparent that when the shaft 72 is rotated in a clockwise direction as viewed in Figure 19, the ratchet members 74 and 75 are caused to rotate therewith, the ratchet teeth 109 coacting with the notches 110 in the notch members 76 and 77, which are themselves non-rotatable, and forcing the notch members 76 and 77 along the shaft 72 towards each other, causing the button members 83 and 84 to approach each other. It will also be obvious that when the sheet of glass 27 is placed between the buttons 83 and 84, and the shaft 72 rotated as above described, the glass will be clamped between the buttons 83 and 84. The parts are so positioned that the buttons 83 and 84 are equally disposed on each side of a vertical plane passing through the center of the grinding wheel 26, and in order to further assure the glass being held vertically, a stop member 111 is provided below the buttons against which the glass 27 is adapted to abut when held in correct vertical position. Should a condition arise where the sheet of glass 27 does not line up properly with the groove 106, means are provided for moving the grinding wheel 26 axially on its shaft 28 to remedy this condition. These means, as shown in Figure 2, are provided in the particular method of supporting the wheel 26 on the shaft 28 which is as follows. The outer end of the shaft 28 is reduced in diameter to form a shoulder 117 against which two larger diametered washers 118 and 119 bear. Slidably received on the reduced end of the shaft 28 is a grinding wheel hub member 120 having a wheel clamping flange 121 against which the annular grinding wheel 26 is adapted to be clamped by the ring 122 and screws 123. On the rear portion of the hub member 120 is threaded an adjusting ring 124 which bears against the washer 119, and which by threading either way on the hub member 120, varies the distance between the hub member 120 and the washer 119, thereby varying the axial position of the grinding wheel 26 and groove 106 relative to the rest of the machine. A nut 125 threaded on the end of the shaft 28 is provided for clamping this mechanism in adjusted position.

The parts described above in connection with the lower guiding and clamping members 68 are duplicated in the upper clamping member 67, an end view of which is shown in Figure 20, and which parts are designated in main by the same numerals in order to facilitate reference thereto. In the upper members, however, instead of using a lever 73, a lever 87 of different design is used, and a ratchet plate 89 having ratchet teeth disposed in an arc about the center of the shaft 72 is secured to the flanged end of the supporting portion 71. The lever 87 is provided with a pawl 88 adapted to engage the teeth in the ratchet plate 89, which pawl is operated and caused to be disengaged from the teeth by depressing the axially movable button member 112 normally held in extended position by the coil spring 113, as shown in Figure 20. The pawl 88, coacting with the notches in the ratchet plate 89, acts to hold the lever in rotated position, and consequently the buttons 83 and 84 in clamping position. In order that the lower clamping devices 68 will work simultaneously with the upper clamping devices 67, and in order to hold them in clamping position, a rod 91 connects the lever 87 of each upper clamping member 67 with the lever 73 of each lower clamping member 68 through the medium swivel connections 90. In accordance therewith, when the lever 87 is rotated so that the pawl 88 is in engagement with the upper portion of the ratchet plate 89, the buttons 83 and 84 of both the upper and lower co-operating clamping devices 67 and 68 are in open or distended position, and when the lever 87 is pulled down from that position to the position shown in Figure 20, the buttons 83 and 84 of each set of clamping devices are in closed or clamping position. As previously described, when a relatively large sheet of glass 27 is being operated upon, the buttons 83 and 84 need only to be brought close enough together to hold the sheet of glass 27 in upright position without clamping it, its weight providing sufficient force for holding it against the grinding wheel 27.

In operation, assuming that the table 92 has been regulated to the proper position in respect to the grinding wheel 26 by means of the hand wheel 98, and the carriage 34 has been brought to one end of the machine and out of position over the grinding wheel 26, and the guiding and clamping members have been adjusted to receive the particular size of glass, the lever 87 is placed in its upper position, a sheet of glass 27 is guided down between the buttons 83 and 84 and allowed to rest in the groove 115 in the upper surface of the table 92. If the glass is not of a size to have sufficient weight to properly hold it down in position the lever 87 is pulled down until the glass is securely clamped between the various buttons 83 and 84, and if of sufficient weight the lever 87 may be pulled down just sufficiently to hold the glass in vertical position without binding it. The lever 50 is then moved to bring the dog clutch member 44 into engagement with either the gear 41 or 42, depending upon which end the carriage 34 happened to be, and the carriage 34 is thereby caused to move towards the other end of the table, carrying the glass 27 over the grinding wheel 26. When the glass 27 has passed over the wheel 26 the carriage 34 is stopped by moving the handle 50 to bring the dog clutch member 44 out of engagement with the engaged gear 41 or 42 as the case may be. Usually one pass over the wheel 26 is sufficient to properly grind the edge of the glass, but if it is found necessary to give it a second pass, the handle 50 may be moved to bring the dog clutch member 44 into engagement with the opposite gear and the carriage 34 and glass 27 is moved back to the other end of the machine. When the edge has been ground sufficiently, whether by one or more passes over the grinding wheel 26, the handle 87 is raised by depressing the button 112 and moving the end of the lever upwardly, and the glass 27 is lifted out and replaced by another sheet. In cases where one sheet of glass is of a different size than one just ground, the clamping and guiding members 67 and 68, the vertically extending horizontally adjustable way members 65 and 66 and frame 55 may be adjusted on their respective way members as previously described to bring the clamping and guiding members into proper position to receive such size of glass.

Although the machine shown in the accompanying drawings and described above is provided with means for grinding but one sheet of glass at a time, it is obvious that by slight changes, within the province of the ordinary workman, it may be readily adapted to grind a plurality of parallel sheets at the same time, and we do not limit ourselves to the grinding of a single sheet as shown.

Formal changes, such as the above and others, may be made in the specific embodiment of the invention described, without departing from the spirit and substance of the broad invention, the scope of which is commensurate with the appended claims.

What we claim is:—

1. In a glass grinding machine having a movable carriage mounted on a fixed support, glass clamping members vertically adjustable thereon, a vertically adjustable frame secured to said carriage, and horizontally adjustable standards mounted thereon for holding said glass clamping members in position to engage the glass.

2. In a machine for forming the edges of glass plates, a stationary base provided with a slidable carriage having vertically disposed slides carrying a frame, vertically disposed supporting members horizontally adjustable on said frame and vertically adjustable glass clamping members supported on said supporting members, a grinding wheel disposed beneath said clamping members, and a vertically adjustable table carried by said base for initially positioning said plates in said clamping members in respect to said wheel.

3. A machine for grinding the edges of glass sheets comprising a stationary base provided with a grooved table, a grinding wheel projecting above said table to engage the bottom edge of said glass, and a longitudinally movable carriage slidably mounted on said base for carrying said glass across said grinding wheel provided with means for holding a sheet of glass in a vertical plane with the lower edge thereof guided in said groove.

4. In a machine for grinding the edges of glass sheets, a stationary base provided with a carriage, a table provided with a groove, a grinding wheel positioned in line with said groove and projecting from beneath said table, means on said carriage for holding a sheet of glass in upright position with the lower edge thereof in said groove and for holding it against relative movement in relation to said carriage, and means for moving said carriage back and forth across said base whereby an edge of the sheet of glass may be moved across said grinding wheel in contact therewith to grind the same.

Signed by us at South Bend, Indiana, U. S. A., this 5th day of June, 1925.

EDGAR R. STODDARD.
LOUIS C. ZILKY.